Oct. 21, 1969 — W. G. MEYERS ET AL — 3,473,813
CYLINDER HEAD GASKET
Filed July 5, 1967 — 2 Sheets-Sheet 1
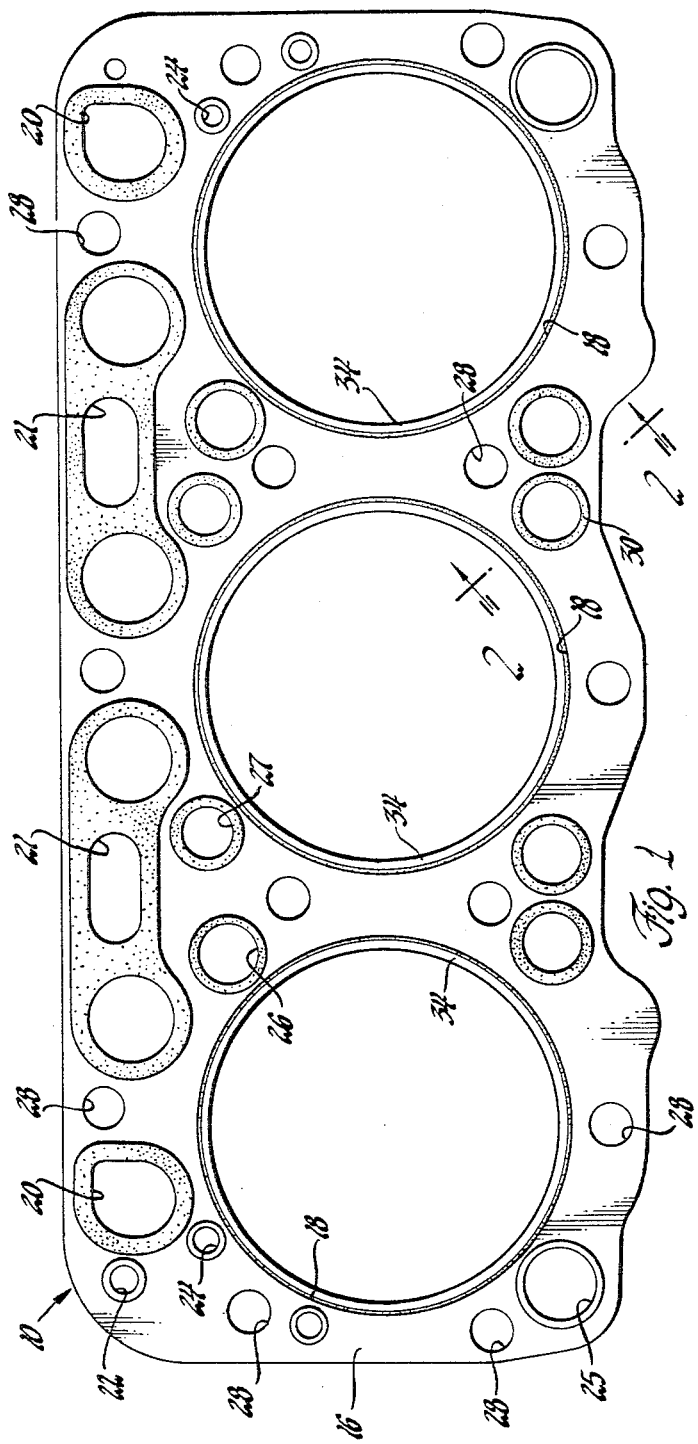
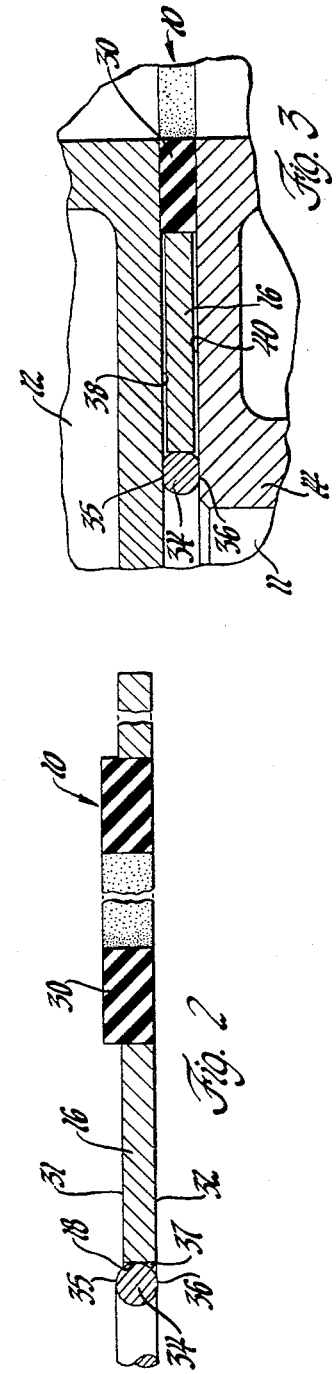
INVENTORS
Willis G. Meyers &
BY Robert A. Bailey
E. J. Biskup
ATTORNEY

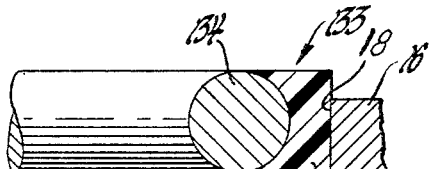
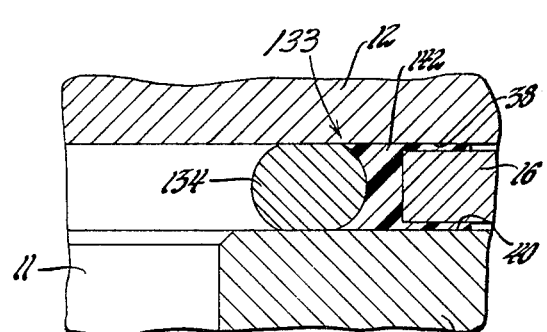
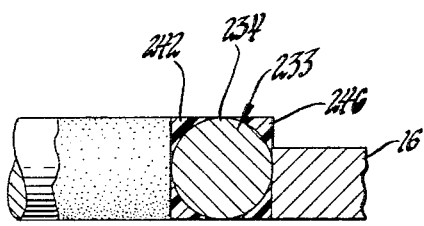
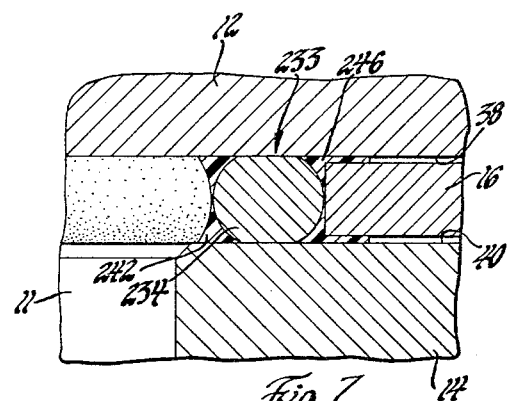
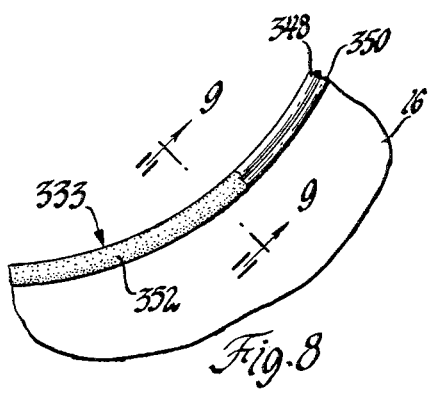
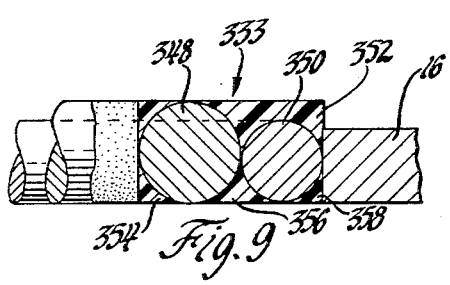
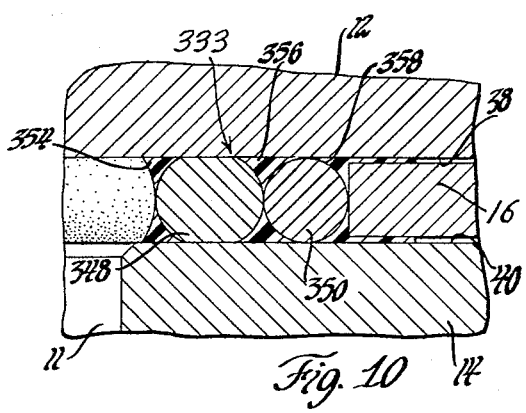

United States Patent Office 3,473,813
Patented Oct. 21, 1969

3,473,813
CYLINDER HEAD GASKET
Willis G. Meyers, Pontiac, and Robert A. Bailey, Birmingham, Mich., assignors to General Motors Corporation, Detroit, Mich., a corporation of Delaware
Filed July 5, 1967, Ser. No. 651,210
Int. Cl. B65d *53/00;* F16j *15/12*
U.S. Cl. 277—180                          6 Claims

ABSTRACT OF THE DISCLOSURE

A gasket assembly for a diesel engine wherein a non-ferrous-clad metallic fire ring, secured to a gasket plate and registering with the cylinder bores, resistingly yields and deforms upon tightening of the cylinder head bolts to provide a continuous metal-to-metal seal about the cylinder bores and between the cylinder head and the cylinder block.

---

In the past, many diesel engine cylinder head gaskets have relied on an asbestos composition material or copper plate to seal between the cylinder head and the cylinder block in the area adjacent the cylinder bores. Where a composition construction is used, the material is subject to deterioriation from the excessive heat and high pressures encountered in diesel applications. While effective sealing may be obtained at the time of original installation, the factors of heat, pressure and temperature variations cause decomposition of gasket material and compression set in the gasket that diminishes the clamping force necessary for proper combustion chamber sealing. When this condition occurs, retorquing of the cylinder head bolts is necessary to reestablish the proper clamping force. In an attempt to obviate the above problems, reinforcing means have been added to such composition gaskets. However, over periods of time, the gasket material may still acquire a compression set and lose its load-bearing characteristics such that the cylinder bolts will also have to be retorqued. While the use of an all-metal gasket minimizes the need for a subsequent retightening of the cylinder head bolts, the load-bearing characteristics of this type of gasket are distributed throughout its contacting surfaces such that inadequate pressure for positive sealing may be applied to the material adjacent the cylinder bores. While it is recognized that adequate sealing must also be maintained for the various cooling and lubricating ports associated with the diesel engine, it is imperative for successful operation of the engine to provide positive and permanent sealing in the area surrounding the cydinder bores. Otherwise, the resultant loss of cylinder compression will significantly reduce the over-all efficiency of the engine. Also, leakage will cause deterioration of the fluid sealing members resulting from exposure to the products of combustion.

The gasket assembly made in accordance with the present invention uses a steel wire fire ring, exteriorally clad with a non-ferrous material such as copper or nickel, inserted at the cylinder openings in a steel gasket plate to obtain localized sealing around the cylinder bores. By deploying non-ferrous material between the ferrous cylinder head and cylinder block, the problem of fretting corrosion is minimized. Fretting corrosion takes place when two metal surfaces are clamped together and subjected to vibrations such as occur during diesel engine operation. Similar metals promote this condition to a greater extent than dissimilar metals. While the exact phenomena of this type of corrosion is not fully defined, it is known that its presence will reduce the clamping forces between the contacting surfaces. The use of commercially available copper or nickel plated steel wire significantly reduces the possibility of fretting corrosion.

The fire ring has a circular cross section with at least one of its two axially opposite surfaces protruding beyond the surface of the gasket plate. When the gasket assembly is interposed between the cylinder head and the cylinder block, and before tightening the cylinder head bolts, the fire rings have coaxial lines of contact with the opposed planar surfaces of the cylinder head and the cylinder block, respectively. As the cylinder head bolts are tightened, a high unit loading is developed at these lines of contact and, upon additional tightening, the fire rings, designed to have a yield point below the yield point of the cylinder block and cylinder head surfaces, resistingly yield and deform. This yielding of the fire rings forms coaxial surface-to-surface sealing areas that, in addition to localizing the compressive forces between the cylinder head and the cylinder block, establishes coaxial annular sealing areas that effectively prevent a loss of cylinder compression. In modifications of the basic invention, an elastomeric sealing member, molded to the fire ring, flows plastically under the compressive loading to provide secondary sealing for the cylinder bores.

Accordingly, the objects of the present invention are: to provide a gasket assembly that effectively and continuously seals the cylinders of a diesel engine; to provide a gasket assembly for a diesel engine that is not subject to fretting corrosion; to provide a gasket assembly wherein a steel wire fire ring, exteriorally clad with a non-ferrous material and registering with the cylinder bores, resistingly yields upon torquing of the cylinder head bolts thereby providing a positive metal-to-metal seal between the cylinder head and the cylinder block that is not subject to compressive setting; to provide a fire ring for sealing the combustion chamber of a diesel engine wherein a circular fire ring made from nickel or a copper-clad steel wire has axially opposite coaxial surfaces that resistingly yield and deform under compressive loading to establish permanent coaxial metal-to-metal sealing areas between the cylinder head and the cylinder block in the area adjacent the combustion chamber; and to provide a gasket assembly for use in a diesel engine wherein nickel or copper-clad steel wire fire rings resistingly yield and deform when the cylinder head bolts are tightened and which, in addition to absorbing the compressive loading of the cylinder head bolts, establish permanent annular sealing areas between the cylinder head and the cylinder block thereby preventing the loss of compression in the combustion chambers, and, wherein elastomeric sealing means, molded to the fire rings, flow plastically under compressive loading to provide secondary areas of sealing adjacent the fire rings.

3

These and other objects will be apparent to one skilled in the art upon reading the following detailed description, reference being made to the accompanying drawings in which:

FIGURE 1 is a top view of a gasket assembly made in accordance with the present invention;

FIGURE 2 is an enlarged side cross-sectional view taken along line 2—2 in FIGURE 1;

FIGURE 3 is a side cross-sectional view of the gasket assembly shown in FIGURES 1 and 2 in assembly between the cylinder block and the cylinder head of a diesel engine;

FIGURE 4 is an enlarged cross-sectional view similar to FIGURE 2 showing an alternative embodiment of the present invention;

FIGURE 5 is a side cross-sectional view showing the gasket of FIGURE 4 in assembly;

FIGURE 6 is a side cross-sectional view of another embodiment of the gasket assembly shown in FIGURES 1 through 3;

FIGURE 7 is a side cross-sectional view of the gasket of FIGURE 6 in assembly;

FIGURE 8 is a partial top view of still another embodiment of the present invention;

FIGURE 9 is an enlarged side cross-sectional view taken along line 9—9 of FIGURE 8; and FIGURE 10 is a side cross-sectional view showing the gasket of FIGURE 9 in assembly.

Referring to FIGURES 1 and 3, a gasket assembly 10 made in accordance with the present invention is adapted to seal the combustion chamber 11 of a conventional diesel engine having a cylinder head 12 and a cylinder block 14. The gasket assembly 10, in general, comprises a gasket plate 16 having cylinder bore openings 18, lubricating port openings 20, 21 and 22, and coolant port openings 24, 25, 26 and 27, all of which are adapted to permit communication between associated ports in the cylinder head 12 and the cylinder block 14 so that proper lubrication, cooling and combustion can be maintained for a particular engine design. To reduce the effects of "hammering" normally encountered in diesel engine operation, the gasket plate 16 is preferably formed of mild steel to provide a load-bearing member at the periphery of the cylinder block 14 and the cylinder head 12. However, it will be appreciated that other gasket plate material will permit successful practice of the present invention.

Additionally, apertures 28 are provided for the reception of conventional cylinder head bolts. The lubricating and coolant port openings in the gasket plate are formed of a substantially greater diameter than those of the associated communicating ports, not shown, to enable associated gaskets, representatively illustrated by gasket 30 in FIGURES 1 through 3, to be seated and retained therewithin. Each of the above gaskets protrude a sufficient distance above or below planar surfaces 31 and 32 so that under compressive loading, in assembly, a fluid tight seal will be obtained about the openings. The location and size of these gaskets, preferably formed of a suitable elastomeric material such as rubber, is such that the internal diameters of each gasket correspond to and register with its associated port opening. It will be understood that suitable variations may be made in the size, shape and location of the above openings and gaskets to conform to a particular diesel engine design.

Located within each of the cylinder openings 18 of the gasket plate 16 are concentric metallic fire rings 34 formed of a one-piece steel wire exteriorly clad with a non-ferrous material such as nickel or copper. The non-ferrous cladding of the fire rings minimizes fretting corrosion that normally occurs when clamped metal surfaces are subjected to vibrations. This corrosion will result in a loss of clamping force between the contacting members over a period of time. This problem is significantly reduced when the contacting members are dissimilar metals. Commercially available nickel or copper plated wires have proved to be satisfactory materials for the fire ring 34. The wire is selected to have a yield point below that of the cylinder block 14 and cylinder head 12 to prevent gouging or marring of the latter under the compressive loading to be described below. As shown in FIGURE 2, the fire ring 34 has a circular cross section including axially opposite opposed surfaces 35 and 36. Each of the fire rings is releasably bonded at 37 to the gasket plate radially inwardly facing surface which defines its respective cylinder opening 18 by a suitable metal-to-metal cement. The cement is used only to hold the fire rings 34 in position to form a united assembly and is not functional in the operation of the gasket assembly 10. In this connection, it should be noted that the fire rings 34 may be staked, in lieu of cementing, to the gasket plate 16. However, the staking operation should not nick the axial surfaces 35 or 36 or deform the shape of the fire ring 34 inasmuch as such defects might lessen the effectiveness of the metal-to-metal sealing to be described below As previously noted, the fire ring 34, formed of a single length of copper-clad steel wire, is initially butt-welded together to form a continuous ring. It has been found that a satisfactory fire ring can be formed of a steel wire having a .03 percent carbon content and clad with a .001 inch layer of non-ferrous material. The ring is then formed to a circular shape and the weld flash is removed so that the upper and lower surfaces 35 and 36 are smooth and parallel. It should be noted that a continuous non-ferrous coating should extend over the entire weld area after the weld flash has been removed to insure effective compressive sealing. The fire ring 34 is relatively sized with respect to the gasket plate 16 so at least one of the axial surfaces 35 or 36 protrudes beyond planar surfaces 31 and 32. A .017 inch projection for a plate thickness of .050 inches has produced satisfactory results. As will be pointed out below, this sizing permits localization of the gasket loading at the fire rings 34 as well as compressive deformation of the axial surfaces 35 and 36.

In installation, the gasket assembly 10 is interposed between the cylinder block 14 and the cylinder head 12 and it will be appreciated that prior to tightening of cylinder head bolts, not shown, the fire rings 34 have annular line contact between the opposed planar surfaces 38 and 40 of the cylinder head 12 and the cylinder block 14, respectively. As the cylinder head bolts are torqued, a high unit loading exists at the line contact of the fire rings 34 and upon additional tightening, the fire rings 34 resistingly yield and deform as shown in FIGURE 3, thereby providing coaxial annular sealing areas at the points where the axially opposite surfaces 35 and 36 contact the opposed surfaces 38 and 40. It has been found that a minimum loading of 55,000 pounds should be applied to each fire ring 34 to insure positive and long-term sealing. The upper limit is determined by seating of the gasket plate 16 between surfaces 38 and 40.

An alternative embodiment of the present invention is shown in FIGURE 4 wherein the fire ring assembly 133 comprises a fire ring 134 and a plastic or elastomeric sealing member 142, formed of a suitable material such as silicone rubber and bonded between the radially inwardly facing surface of the fire ring 134 and the cylinder opening 18. In this composite design and as shown in FIGURE 5, when the clamping bolts are tightened, the fire ring 134 resistingly yields and deforms as previously described while the sealing member 142 flows plastically under compressive loading to provide secondary sealing at the contact surfaces 38 and 40. As shown in FIGURE 5, a portion of the sealing member 142 will extrude radially outwardly in the voids between the gasket plate 16, the cylinder block 14 and the cylinder head 12. The inner diameter of the sealing member 142 should be selected so that the deformation occurs without the cylinder opening 18. The properties of silicone rubber are well suited for this use. In addition to having high temperature resistance and positive sealing capabilities, the silicone rubber is readily extrudable. Therefore, any material flowing toward the contacting zones will be completely extruded therefrom thereby insuring uninterrupted metal-to-metal contacting of the fire ring 134 with surfaces 38 and 40.

Another embodiment is shown in FIGURE 6 wherein the fire ring assembly 233 comprises a fire ring 234 and inner and outer silicone rubber sealing members 242 and 246, secured to its inner and outer diameters, respectively. When this assembly is clamped between the cylinder head 12 and cylinder block 14, the fire ring 234 and the outer sealing member 246 deform, as seen in FIGURE 7, and seal in the manner previously described to provide primary and secondary sealing for the combustion chamber 11. Additionally, sealing member 242 seals by its resistance to elastic deformation when compressively loaded between the cylinder head 12 and the cylinder block 14.

In another modification shown in FIGURES 8 through 10, the fire ring assembly 333 is a composite design comprising two adjacent concentric metal rings 348 and 350 encapsulated in a silicone rubber sealing member 352 having an inner portion 354, a midportion 356 and an outer portion 358. Ring 348 has substantially the same diameter as the previously described fire rings while ring 350 has a diameter substantially equal to or slightly greater than the thickness of the gasket plate 16. When compressed between the cylinder head 12 and the cylinder block 14, as shown in FIGURE 10, the portions 354, 356 and 358 flow plastically to seal the contacting surfaces therebetween and ring 348 resistingly yields and deforms as previously described. In assembly, ring 350 is designed to have annular line contact with surfaces 38 and 40 so that portion 356 is retained between rings 348 and 350. Thus, it will be appreciated that this embodiment provides separate sealing between surfaces 38 and 40 by five members: portions 354, 356 and 358, ring 348 and ring 350.

From the above description, it will be appreciated that the present invention provides a gasket assembly wherein the clamping forces of the cylinder head bolts are essentially localized at the fire rings. In addition to the compressive absorbing forces, the fire rings resistingly yield and deform to provide an effective metal-to-metal sealing contact between the cylinder head and the cylinder block thereby preventing a loss of compression in the combustion chamber. The above-described invention also effectively utilizes the sealing characteristics of elastomeric materials to provide additional sealing members.

Since other changes and modifications will be apparent to one skilled in the art, the scope of the invention, as defined by the appended claims is intended to cover such alterations of the illustrative embodiment.

What is claimed is:

1. A gasket assembly for a diesel engine having a ferrous metal cylinder head and a ferrous metal cylinder block and including fluid ports and a plurality of cylinder bores defining cylindrical combustion chambers, said gasket assembly comprising a gasket plate having openings in which are retained seal means adapted to register with and seal about said fluid ports when said gasket plate is clamped in position between the cylinder head and cylinder block, said gasket plate including a plurality of cylindrical openings larger in diameter than said cylinder bores and arranged to register coaxially with said cylinder bores when said gasket plate is clamped in said position, and a fire ring member attached by suitable securing means to said gasket plate within each of said cylindrical openings, said fire ring member including at least one annular sealing element having a ferrous metal wire core of circular cross section with the exterior surfaces coated by a thin layer of a non-ferrous metal that is resistant to fretting corrosion when used against ferrous metals, said annular sealing element having a yield point below the yield points of said cylinder block and said cylinder head and having a thickness greater than said gasket plate, whereby, upon clamping of said gasket assembly between opposing planar surfaces of said cylinder head and cylinder block, the axially opposite exterior surfaces of said annular sealing element first contact said planar surfaces in axially spaced circles and said sealing element then resistingly yields and deforms to provide axially spaced annular areas of sealing contact with said planar surfaces.

2. The assembly of claim 1 wherein the annular sealing element is formed from wire having a steel core coated with a metal selected from the group consisting of copper and nickel.

3. The assembly of claim 1 wherein the annular sealing element is formed from wire having a steel core of about .03 percent carbon content and clad with a thickness of about .001 inches of a metal selected from the group consisting of copper and nickel.

4. The assembly of claim 1 wherein said fire ring member further includes a second annular sealing element concentrically surrounding said first mentioned annular sealing element and encapsulated therewith in a body of silicone rubber, said second annular sealing element having a thickness substantially equal to the thickness of said gasket plate and said silicone rubber body having a portion bonded to said gasket plate to act as said securing means and being adapted to flow plastically under compressive loading to form a plurality of annular sealing areas between and adjacent said annular sealing elements.

5. A gasket assembly for a diesel engine having a ferrous metal cylinder head and a ferrous metal cylinder block and including fluid ports and a plurality of cylinder bores defining cylindrical combustion chambers, said gasket assembly comprising a gasket plate having openings in which are retained seal means adapted to register with and seal about said fluid ports when said gasket plate is clamped in position between the cylinder head and cylinder block, said gasket plate including a plurality of cylindrical openings larger in diameter than said cylinder bores and arranged to register coaxially with said cylinder bores when said gasket plate is clamped in said position, and a fire ring member disposed within each of said cylindrical openings, each said fire ring member including at least one annular metal sealing element and a silicone rubber sealing element bonded to the outer surface of its respective metal sealing element and having a portion bonded to said gasket plate to secure said fire ring member to said gasket plate, said metal sealing element having a ferrous metal wire core of circular cross section with the exterior surfaces coated by a thin layer of a non-ferrous metal that is resistant to fretting corrosion when used against ferrous metals, said metal sealing element having a yield point below the yield points of said cylinder block and said cylinder head and having a thickness greater than said gasket plate and said silicone rubber sealing element connecting said metal sealing element to the respective cylinder opening defining portion of said gasket plate and being adapted to flow under compressive loading, whereby, upon clamping of said gasket assembly between opposing planar surfaces of said cylinder head and cylinder block, the axially opposite exterior surfaces of said annular metal sealing element first contact said planar surfaces in spaced coaxial circular lines and said metal sealing element then resistingly yields and deforms to provide axially spaced annular areas of primary sealing contact with the planar surfaces and said silicone rubber element flows to form axially spaced annular areas of secondary sealing contact with said planar surfaces.

6. The assembly of claim 5 wherein a second silicone rubber sealing element is bonded to the radially inwardly facing surface of said annular metal sealing element and said second silicone rubber sealing element is adapted to flow plastically upon clamping of said gasket assembly between opposing planar surfaces of said cylinder head and cylinder block to form axially spaced ternary annular areas of sealing contact with said planar surfaces.

References Cited

UNITED STATES PATENTS

| | | | |
|---|---|---|---|
| 1,781,365 | 11/1930 | Burgmann. | |
| 2,395,243 | 2/1946 | Aukers | 277—166 |
| 2,679,241 | 5/1954 | Dickson | 277—180 X |
| 3,279,805 | 10/1966 | Quinson | 277—180 X |
| 3,285,631 | 11/1966 | Stolpmann. | |

SAMUEL ROTHBERG, Primary Examiner

U.S. Cl. X.R.

277—166, 235